United States Patent [19]
Hopper

[11] Patent Number: 5,332,955
[45] Date of Patent: Jul. 26, 1994

[54] POSITION SENSING APPARATUS WITH CONTINUOUS UPDATE

[75] Inventor: Michael G. Hopper, Alameda, Calif.

[73] Assignee: Carco Electronics, Menlo Park, Calif.

[21] Appl. No.: 735,141

[22] Filed: Jul. 24, 1991

[51] Int. Cl.⁵ .......................................... G05D 23/275
[52] U.S. Cl. .................................... 318/632; 318/616; 318/661
[58] Field of Search ................. 318/600, 601–603, 318/606–608, 611, 629, 632–633, 615, 661, 615–616

[56] References Cited

U.S. PATENT DOCUMENTS

| | | | |
|---|---|---|---|
| 4,253,051 | 2/1981 | Schneider | 318/632 |
| 4,352,050 | 9/1982 | Sakano | 318/661 |
| 4,748,555 | 5/1988 | Miyake et al. | 318/632 X |
| 4,792,739 | 12/1988 | Nakamura et al. | 318/661 |
| 4,945,501 | 7/1990 | Bell et al. | 364/571 |
| 4,947,093 | 8/1990 | Dunstan et al. | 318/632 X |
| 4,968,923 | 11/1990 | Busujima | 318/560 |
| 4,988,936 | 1/1991 | Schneider | 318/632 |

Primary Examiner—William M. Shoop, Jr.
Assistant Examiner—David Martin
Attorney, Agent, or Firm—Townsend and Townsend Khourie and Crew

[57] ABSTRACT

A position measurement system includes position error circuitry (PEC) that responds to periodically provided actual position information and a computed position to provide correction information, and a position synthesizer which responds to the correction information to provide the computed position. The computed position information is fed back to the PEC. The position synthesizer establishes a rate of change of the computed position based on the correction information in a manner tending to make the computed position track the actual position. The position synthesizer updates the computed position many times for each time that the actual position information is provided to the PEC, and thus provides much more continuous position information.

23 Claims, 3 Drawing Sheets

POSITION SENSING APPARATUS WITH CONTINUOUS UPDATE

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The invention relates to devices, such as flight simulators, where the position (angular or linear) of a movable element relative to a fixed element must be controlled very accurately. The invention relates more specifically to the position measurement that is used in the servo control of such devices.

A flight simulator provides a platform supported in a gimballed arrangement, so that the platform may be rotated about one or more axes. A control system for rotation about one of the axes typically includes an actuator such as a torquer, a position sensor such as a resolver, a mechanism for generating position commands, and a closed loop servo for causing the measured position to track the commanded position.

U.S. Pat. Nos. 4,253,051 and 4,988,936, hereby incorporated by reference, describe portions of a representative prior art system. In brief, the position sensor typically includes a stator, a rotor inductively coupled to the stator, and circuitry for exciting the stator and detecting the induced signal in the rotor. The relative phase between the stator and rotor signals is representative of the relative displacement between the stator and rotor.

A known way of measuring the phase difference is to generate pulses at a frequency that is a fixed factor multiple of the rotor output signal frequency. The number of pulses occurring between corresponding points in the stator and rotor signal cycles, divided by the fixed factor, gives the fraction of a cycle that the two signals are out of phase. The frequency multiplication may be accomplished by a digitally closed phase locked loop (PLL). The PLL includes, among other things, a frequency divider corresponding to the fixed factor multiple to be achieved, and a counter whose output represents the relative position.

It is known in the art to provide separate coarse and fine measurements of the relative position. Each requires a separate resolver and PLL. The coarse number is capable of defining the position within the entire expected range, while the fine number defines positions within a range that is much narrower. For example, a two-pole-resolver generates a 360° phase shift between the stator excitation signal and the rotor output signal for every 360° of relative mechanical rotation, and is suitable for extracting the coarse number. A 720-pole resolver produces an electrical phase shift of 360° for every 1° of relative mechanical rotation, and may be used to extract the fine number. The coarse and fine numbers are used to generate coarse and fine position errors for the servo.

In the prior art system the coarse and fine numbers are BCD entities having ranges of 000.0 to 359.9 and 0.0000 to 0.9999, respectively. The fine number's tenths digit is the more accurate one, so to account for possible misalignment as the rotors are rotated over 360 degrees, the tenths digit of the coarse number is offset by −0.5 degrees, and the coarse number is latched only when it has caught up to the tenths digit of the fine number. One characteristic of the prior art position measurement system is that the coarse and fine numbers (which provide the computed position) are available only once on each cycle of the resolver excitation.

SUMMARY OF THE INVENTION

The present invention is a position measurement technique that provides position information that is updated on a substantially continuous basis. In brief, apparatus according to the invention includes position error circuitry (PEC) that responds to periodically provided actual position information and a computed position to provide correction information, and a position synthesizer which responds to the correction information to provide the computed position. The computed position information is fed back to the PEC. The position synthesizer establishes a rate of change of the computed position based on the correction information in a manner tending to make the computed position track the actual position. The position synthesizer updates the computed position many times for each time that the actual position information is provided to the PEC, and thus provides much more continuous position information.

In a particular embodiment, the actual position information is provided by a position sensor comprising a resolver having relatively movable elements, a counter, timing circuitry which excites the resolver at a fixed excitation frequency and increments the counter at a multiple of the excitation frequency, a zero crossing detector (ZCD), which provides a signal at a frequency and phase that correspond to the relative position and velocity of the resolver's elements, and a latch which stores the counter value in response to the (ZCD) signal.

In the particular embodiment, the correction information provided by the PEC is a specified rate of change. Upon being provided with the actual position, the PEC computes a position error based on the difference between the actual and computed positions. It then changes the specified rate by an amount that depends at least on the position error, and possibly on one or more previous values of the position error. In the particular embodiment, the position synthesizer periodically changes the computed position by an amount corresponding to the specified rate. This occurs many times for each time the PEC changes the rate.

A further understanding of the nature and advantages of the present invention may be realized by reference to the remaining portions of the specification and the attached drawings.

BRIEF DESCRIPTION OF THE APPENDICES

Appendix 1 is a two-page source code listing of the position rate computation; and Appendix 2 is a three-page source code listing of the position synthesis computation.

DESCRIPTION OF SPECIFIC EMBODIMENTS

Prior Art Position Computation

As discussed above, a typical angular position measurement in a flight simulator includes generating a coarse number with a two-pole resolver and a fine number using a 720-pole resolver. The phase of the two-pole resolver signal shifts 360° for every 360° of rotation while the phase of the 720-pole resolver signal shifts 360° for every 1° of rotation. Separate circuitry is provided for each resolver, and the resolvers and associated circuitry are further duplicated to the extent that more than one axis of motion is required.

Figure 1:
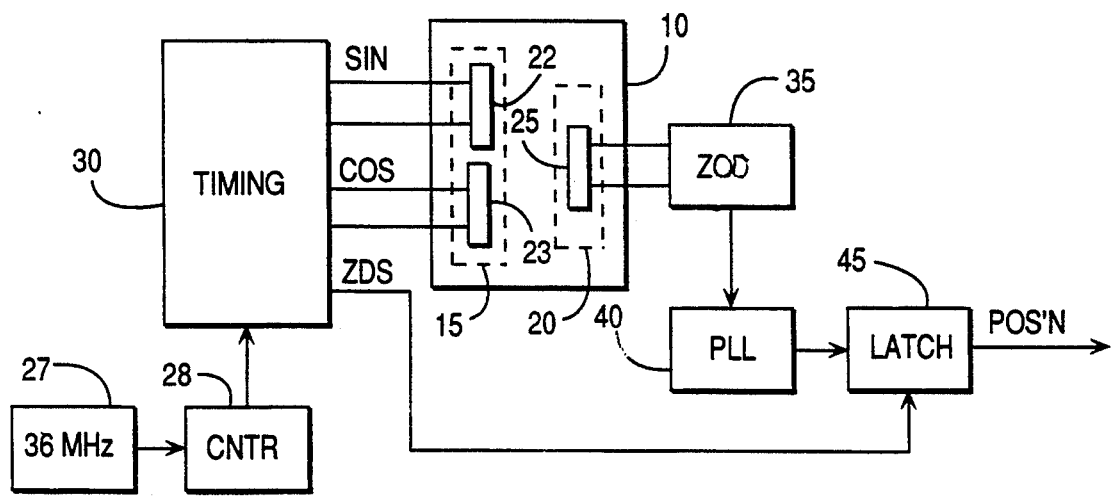
FIG. 1 is a block diagram illustrating a prior art system for sensing and computing position.

FIG. 1 is a block diagram showing the circuitry associated with a single resolver 10 for sensing and computing angular position. Resolver 10 comprises a stator 15 and a relatively rotatable rotor 20. The stator includes first and second coils 22 and 23 which are arranged in an orthogonal configuration, while the rotor includes a coil 25. A master oscillator 27 operated at 36 MHz drives a 4-digit BCD counter chain 28 which resets every 10,000 cycles. The counter output is communicated to a timing circuit 30, which provides a pair of 3.6 KHz sine waves having the same amplitude but with a relative phase of 90° and a signal referred to as the zero degree strobe (ZDS), which provides a defined transition at a fixed phase relative to the sine waves. The sine waves are in the first instance generated digitally by using the high-order two digits of the counter chain to sequentially address PROMs in which a numerical representation of a sine wave is stored. The resulting digital signals are converted to analog signals and filtered.

In operation, stator coils 22 and 23 are driven by the sinusoidal signals. A signal representing a linear superposition of the stator coil signals is induced in the rotor coil. The precise combination is a function of the angle between rotor 20 and stator 15. The resolver is designed so that the proportionality constants are $\sin\theta$ and $\cos\theta$ where $\theta$ is the angle between the rotor coil and the first stator coil. Thus, the rotor signal frequency and amplitude are independent of the relative angle between the rotor and the stator, while the phase is shifted relative to the signal on the first stator coil by an amount corresponding to the relative angle.

The rotor signal is communicated to a zero crossing detector (ZCD) 35, which provides a square wave having transitions corresponding to the zero crossings of the sinusoidal rotor signal. The signal from the ZCD is communicated to a phase locked loop (PLL) 40. PLL 40 provides pulses at a frequency that is a fixed multiple of the frequency of pulses from the ZCD, and includes a counter which counts pulses at this fixed multiple frequency. A latch 45 receives the counter output from PLL 40, and latches it on every defined transition of the ZDS signal. Since the ZDS signal represents a fixed phase, the latched PLL counter value represents the phase difference between the ZCD and ZDS signals.

In the representative prior art system, the counter in the coarse PLL counts from 0000 through 3599 before resetting to 0000 while the counter in the fine of PLL counts from 0000 through 9999 before resetting to 0000. As mentioned above, the coarse and fine numbers are combined to provide position information for the servo system. The particular operations that make use of the computed position values are not relevant to the present invention and will not be described further.

Overview of Present Invention

Figure 2:
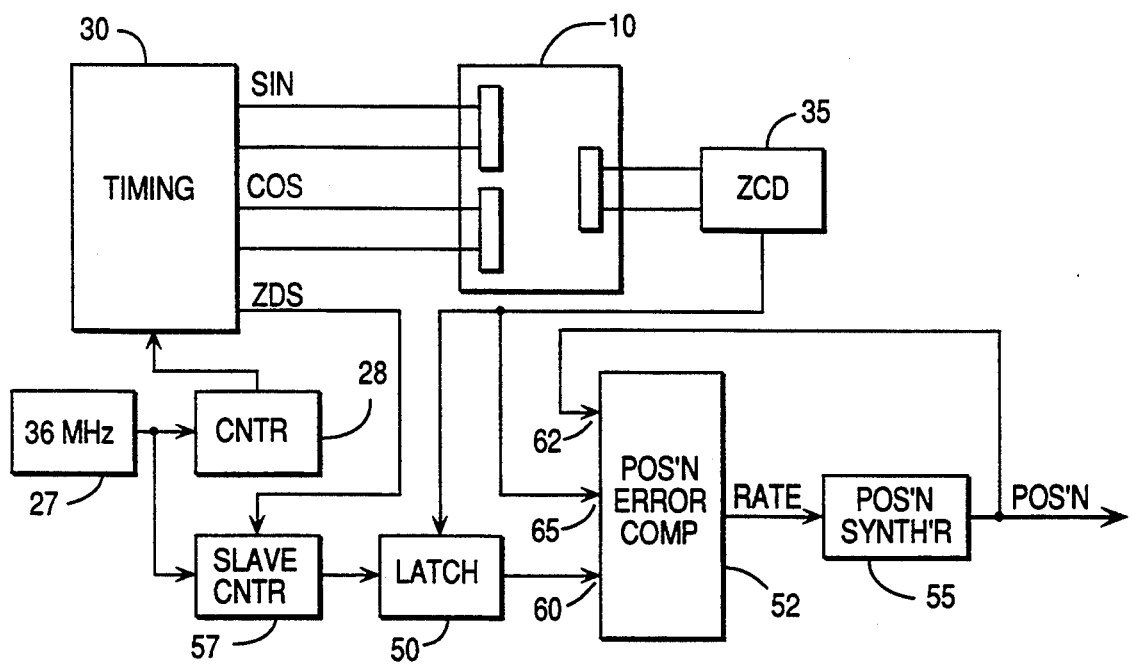
FIG. 2 is a block diagram of a system according to the present invention for sensing and computing position.

FIG. 2 is a block diagram illustrating improved position sensing and computation circuitry associated with a single resolver according to the present invention. The present invention utilizes some of the same components as the prior art system, and corresponding reference numerals will be used. In particular, it includes resolver 10, master oscillator 27, counter chain 28, timing circuit 30, and ZCD 35.

The position computation circuitry includes a latch 50, a position error circuit (or position error computer, referred to as PEC) 52, and a position synthesizer 55. Latch 50 responds to the value in counter 28, and stores this value in response to the ZCD signal. In a specific embodiment, the position computation circuitry is on a separate circuit card from the master timing circuitry. For circuit efficiency reasons, a slave counter 57 is used to provide the data to latch 50. The use of the slave counter means that only the master oscillator signal and the ZDS signal need be communicated between circuit cards, thereby avoiding the need to communicate the multi-bit counter contents.

PEC 52 includes a primary signal input 60, a feedback signal input 62, and an interrupt input 65, and provides a rate signal to position synthesizer 55. Position synthesizer 55 uses the rate signal and other signals to be described below, and generates a computed position signal. The computed position signal is fed back to the feedback input on PEC 52.

In operation, the ZCD signal causes latch 50 to latch the contents of counter 28 (57) and interrupts PEC 52 to cause it to compute a new rate signal based on the newly presented position information. The newly presented position information is compared to the computed position at the feedback input, and a position error is computed. The current value of the rate signal is updated to take into account the current position error and possibly one or more previous values of the position error. Position synthesizer 55 increments the computed position many times for each update in the rate signal. For example, the rate is added to the computed position every 480 ns.

The position information from the latch is sometimes referred to as feedback data since it represents feedback from the resolver, but should not be confused with the position signal that is fed back from position synthesizer 55 to PEC 52.

Specific Embodiment of the Invention

Figure 3:
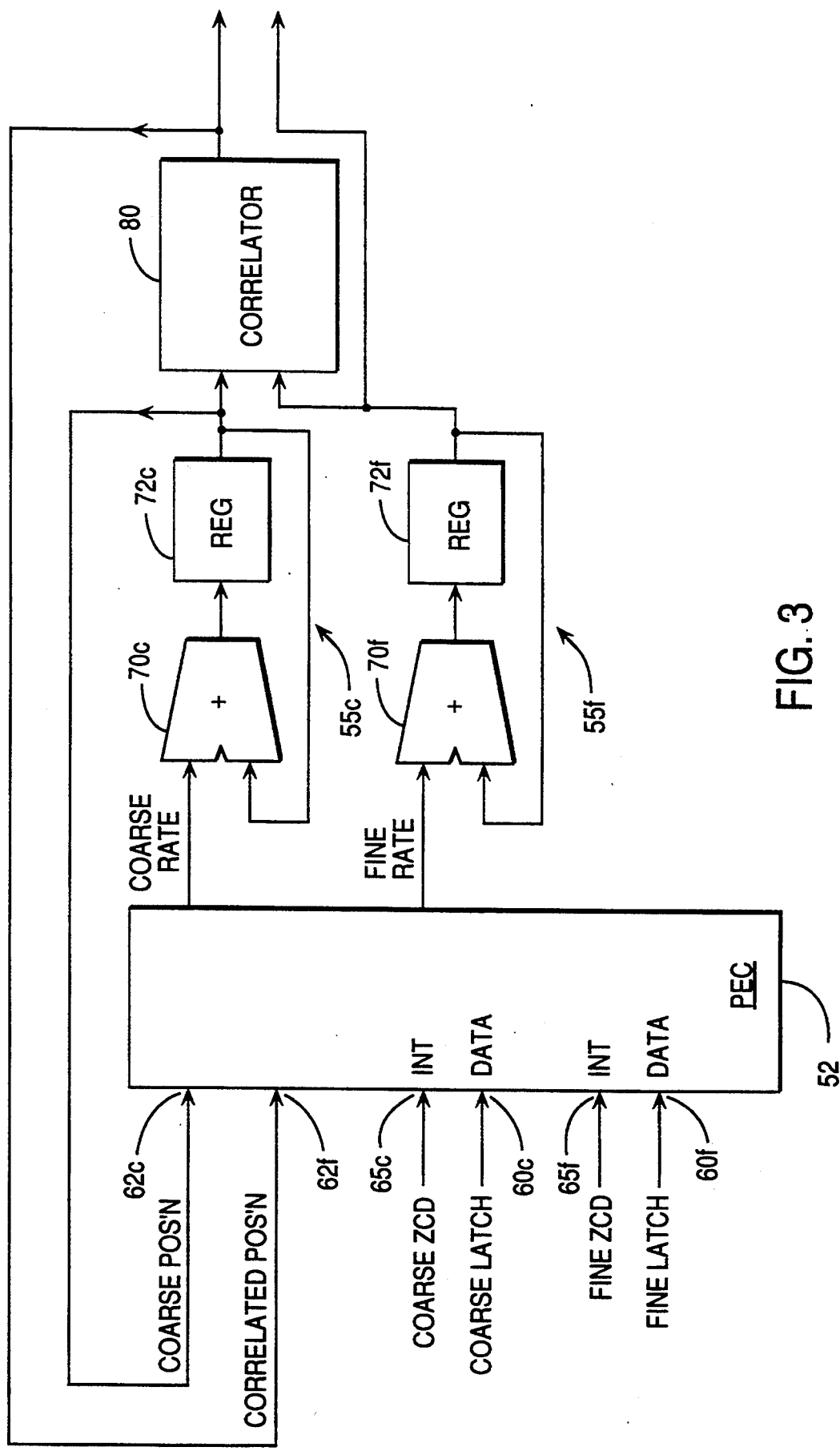
FIG. 3 is an expanded block diagram showing the position error circuitry (PEC) and position synthesizer.

FIG. 3 is an expanded block diagram illustrating the PEC and position synthesizer for a single axis having coarse and fine resolvers. The overall position sensing and computation circuitry for the axis includes a single set of timing and counter circuitry as shown in FIG. 2, but includes separate resolvers, ZCDs, and latches for the coarse and fine numbers. None of these elements are illustrated in FIG. 3. Reference numerals of elements corresponding to those in FIG. 2 are used, with the suffixes "c" and "f" denoting elements for the coarse and fine numbers. The signals from the coarse and fine latches and ZCDs are shown as being communicated to PEC 52 at primary signal inputs 60c and 60f and at interrupt inputs 65c and 65f. Coarse and fine position signals are communicated to feedback signal inputs 62c and 62f.

PEC 52 calculates current (new) values for the coarse and fine rate signals as follows, it being understood that the calculation is the same for both, but based on the coarse or fine information, as the case may be. The calculation occurs in response to an interrupt from the ZCD. At this point there are stored values for the previous (old) rate and error that were calculated in response to the previous interrupt. First, the current error is calculated by subtracting the expected position value (at the feedback signal input) from the actual position value (at the primary signal input) and limiting the absolute value to 0.1 degrees.

The current value for the rate is calculated by taking the previous rate plus twice the current error minus the previous error. This provides some lead if the error is increasing. Nyquist's theorem requires that the rate be limited to one-half the 3600-Hz excitation frequency (the actual limit selected is somewhat less, namely 1700°/sec). The rate is also damped for calculated values less than 100°/sec by multiplying the rate by a factor that varies linearly from 0 to 1 over the range of 0° to 100°/sec. This has the effect of reducing system noise.

The coarse and fine rates are communicated to respective position synthesizers 55c and 55f. Synthesizer 55c includes an adder 70c and a position output register 72c. The adder has a first input to which the rate is communicated and a second input to which the register output is communicated. The register stores the value output by the adder. The register is clocked every 480 ns and thus updates the position based on the rate signal. The output of register 72c is fed back to feedback signal input 62c on PEC 52. The values from the coarse and fine accumulators are communicated to a correlation circuit 80, and for an implementational reason the correlated coarse value, rather than the fine value, is communicated to feedback signal input 62f.

Although the correlation circuit does not form a part of the present invention, it will be described briefly. The purpose of the correlation circuit is to correlate the coarse and fine numbers for the display and for the servo that controls the actual movement of the platform. In this embodiment the least significant part of the coarse number and the most significant part of the fine number have the same range of precision, but the fine number's portion is more accurate.

The coarse and fine numbers are handled internally as 32-bit binary fractions and the coarse number is converted to a fixed point number with the binary point aligned with the fine number's binary point. More specifically, the top half of the fine word is taken as the ultimate fractional part (Q16 format). The coarse number is right shifted by 16 bits and multiplied by 360. This provides 9-bit integral portion. To account for possible misalignment errors, the resolvers are misaligned by 0.5 degrees. If the least significant part of the coarse number is greater than the most significant part of the fine number, the coarse number is left alone; if less, the coarse number is reduced by 1.

Figure 4:
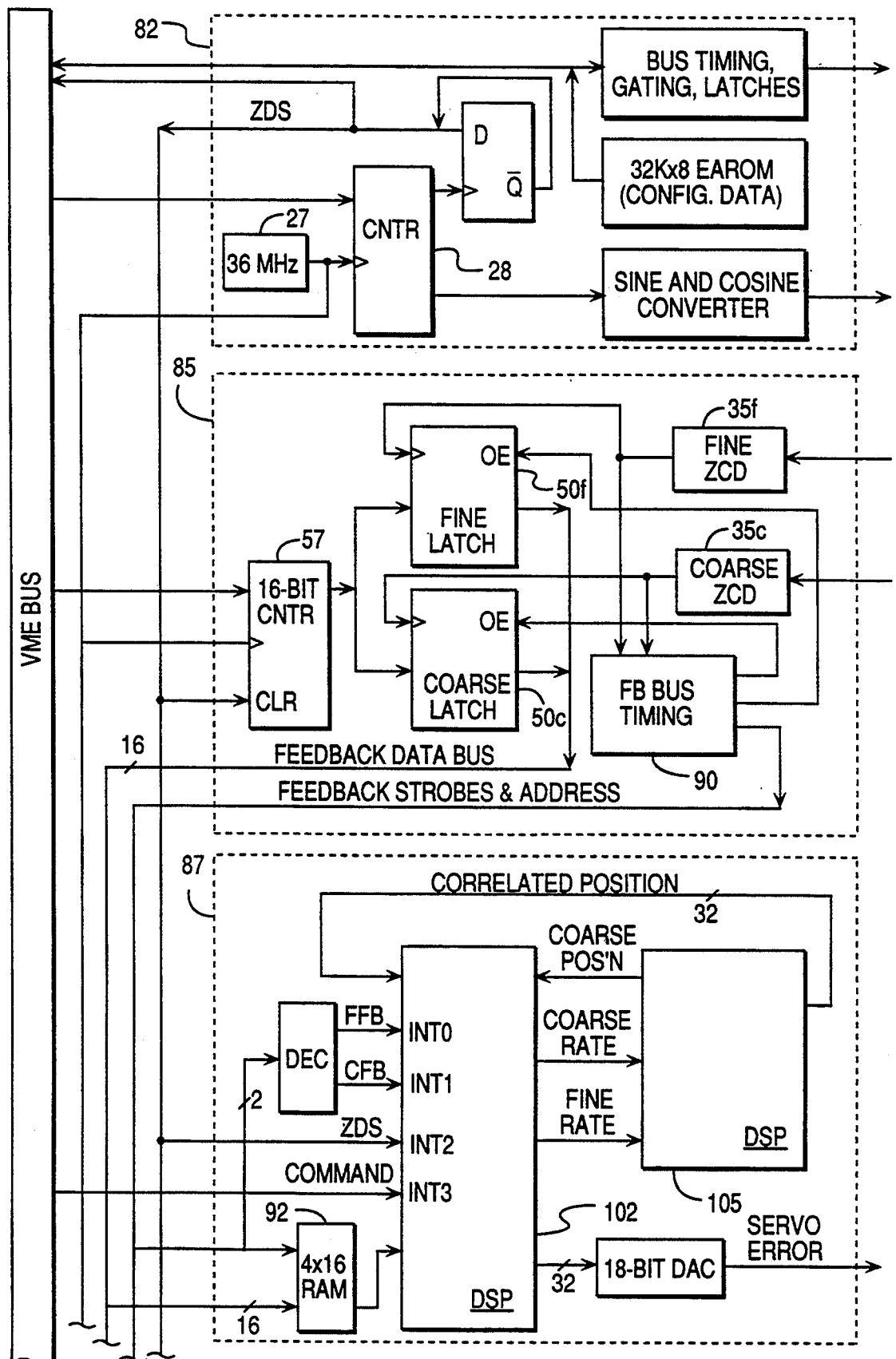
FIG. 4 is a schematic showing a particular embodiment of the invention.

FIG. 4 is a logic schematic of a particular embodiment of the invention. The circuitry described above for a single axis resides on three circuit cards 82, 85, and 87, referred to as the Reference/Parallel Interface card, the Feedback Interface card, and the Axis Processor Card. The cards are supported in an industry standard VME chassis and communicate with a host computer via the VME bus and with each other over the VME and other buses. A typical system would also contain a CPU card (for example, based on a Motorola 68030 microprocessor) for front panel and host interface management and system control. This latter card is not part of the invention and will not be described further.

Reference/Parallel Interface card 82 includes master oscillator 27, counter chain 28, and portions of timing circuitry 30 for generating the ZDS signal and sinusoidal signals. This card supports up to nine axes.

Feedback Interface card 85 includes slave counter 57, and the coarse and fine ZCDs 35c and 35f, and coarse and fine latches 50c and 50f for up to three axes. The ZCDs receive the resolver signals and cause the latches to latch the counter contents (feedback data) accordingly. A timing circuit 90 causes 16 bits of latch data and a 2-bit address (representing coarse/fine, which is used, and high/low half, which is not currently used) to be bused to the three Axis Processor cards that it controls, and provides radial card select strobes to the three cards. The coarse and fine data for three axes is sent out in at most 120 ns which represents negligible delay compared to the intervals (278 µs) at which the data is latched.

Axis Processor card 87 receives the latch data and address from the Feedback Interface card along with a strobe if the data is meant for that card. When it receives a card select strobe, it stores the data in a 4×16-bit RAM 92, and decodes the address to generate the coarse or fine interrupt as the case may be.

The position error computation and position synthesis are carried out in a pair of digital signal processors (DSPs) 102 and 105. DSP 102 performs the position error computation (i.e., incorporates PEC 52), while DSP 105 performs the position synthesis and correlation (i.e., incorporates synthesizers 55c and 55f and correlation circuit 80). DSP 102 also calculates the servo errors (fine error and correlated coarse error). The servo errors are the differences between commanded position (received from the VME bus) and measured position (as generated on the Axis Processor card), and should not be confused with the position errors that the PEC uses to generate the rate signals.

Since DSP 102 requires the correlated coarse position for the servo error, it is convenient to allow the fine position information required by the PEC to be communicated as part of the correlated coarse position, which contains 16 bits of fine position information. It is noted that the coarse position information is fed back from DSP 105 to DSP 102 via the serial ports, while the correlated coarse information (which includes the fine information) is fed back over the parallel bus, which is considerably faster. DSP 105 also generates a PPR pulse for every 360° rotation and a PPD pulse for every 1° rotation.

Discussion of the Software

As noted above, certain portions of the invention are implemented in software on DSPs 102 and 105. Appendix 1 (© 1991 Carco Electronics, Unpublished Work) provides a source code listing (lines 1356–1417) for the fine rate computation (interrupt routine) carried out in DSP 102. The coarse rate computation is substantially the same. Appendix 2 (© 1991 Carco Electronics, Unpublished Work) provides a source code listing (lines 0004–0145) for the position synthesis routine carried out in DSP 105. The actual synthesis is carried out in the loop at lines 0125–0142. The program is written in assembler language for a Texas Instruments TMS320C30 DSP. The copyright notice in the name of Texas Instruments refers to the assembler, not the program code.

Conclusion

While the above is a complete description of the preferred embodiment of the invention, various modifications, alternative constructions, and equivalents can be used. For example, while the disclosed embodiment has the feedback signal provided by coarse and fine resolvers, other types of digital and analog encoders could be used. Therefore, the above description and illustration should not be taken as limiting the scope of the invention which is defined by the claims.

APPENDIX 1

Copyright 1991 (Unpublished Work) Carco Electronics, Inc.

TMS320C30 COFF Assembler    Version 4.00    Wed Jul 03 06:52:44 1991
Copyright (c) 1987-1990 Texas Instruments Incorporated Servo DSP program    Version 05-09-91                          PAGE    30

```
1356               ;- - - - - - - - - - - - - - - - - - - - - - - - - - - - - - -
1357
1358               ;     Fine feedback interrupt routine.
1359               ;     46 cycles * 60 nS = 2.76 uS
1360
1361               ;- - - - - - - - - - - - - - - - - - - - - - - - - - - - - - -
1362 809a37 0f350000   IntFine push   st
1363 809a38 0f200000           push   r0              ; Save R0 LS 32 bits
1364 809a39 0fa00000           pushf  r0
1365
1366               ;     Convert Position Synthesizer fine position to Q32 BAMS
1367
1368 809a3a 08400704           ldi    *+X(PSPos),r0   ; R0 = Correlated position
1369 809a3b 09e00010           lsh    16,r0           ; Position to MSB
1370 809a3c 15400530           sti    r0,*+V(FBFPSPos); Save current PS fine pos for VME monitoring
1371
1372               ;     Convert fine feedback position to Q32 BAMS
1373
1374 809a3d 08400701           ldi    *+X(FineFB),r0  ; R0 = raw feedback value
1375 809a3e 02e07fff           and    7fffh,r0        ; Strip off unused bits
1376 809a3f 0aa09b3a           mpyi   @FB2Q32BAMS,r0  ; R0 = R0 * (2**32 / 20000)
1377 809a40 02400510           addi   *+V(FNullOff),r0; R0 = Rotate for axis null
1378 809a41 15400531           sti    r0,*+V(FBFFBPos); Save current FB fine pos for VME monitoring
1379
1380               ;     Compute current fine position error and clamp to max
1381
1382 809a42 18400530           subi   *+V(FBFPSPos),r0; R0 = current fine position error Q32 BAMS
1383 809a43 05800000           float  r0
1384 809a44              LimitF FErr,r0               ; Limit range
!0001 809a44 04209b7d   cmpf  @PLmtFErr,r0
!0002 809a45 44a09b7d   ldfgt @PLmtFErr,r0
!0003 809a46 04209b7e   cmpf  @NLmtFErr,r0
!0004 809a47 43a09b7e   ldflt @NLmtFErr,r0
1385
1386               ;     Compute new fine rate as: rate += (2*current error) - (previous error)
1387
1388 809a48 14209b7a           stf    r0,@CurFErr     ; Save current fine error
1389 809a49 0a601000           mpyf   2.0,r0          ; R0 = 2 * CurrentError
1390 809a4a 01a09b7c           addf   @CurFRate,r0    ; R0 = Rate + 2 * CurrentError
1391 809a4b 17a09b7b           subf   @PrevFErr,r0    ; R0 = Rate + 2 * CurrentError - PreviousError
1392
```

```
1393 809a4c                          LimitF  FRate,r0        ; Limit range
!0001 809a4c 04209b7f        cmpf  @PLmtFRate,r0
!0002 809a4d 44a09b7f        ldfgt @PLmtFRate,r0
!0003 809a4e 04209b80        cmpf  @NLmtFRate,r0
!0004 809a4f 43a09b80        ldflt @NLmtFRate,r0
1394
1395                         ;       Dampen the rate
1396
1397 809a50 14209b7c          stf     r0,@CurFRate    ; Save current rate
1398 809a51 00000000          absf    r0
1399 809a52 0a209b81          mpyf    @InvFRDamp,r0
1400 809a53 04600000          cmpf    1.0,r0          ; Rate > Max dampening?
1401 809a54 44e00000          ldfgt   1.0,r0          ; Clamp it to 1.0
```

Copyright 1991 (Unpublished Work) Carco Electronics, Inc.

TMS320C30 COFF Assembler    Version 4.00   Wed Jul 03 06:52:44 1991
Copyright (c) 1987-1990  Texas Instruments Incorporated Servo DSP program    Version 05-09-91                          PAGE   31

```
1402 809a55 0a209b7c          mpyf    @CurFRate,r0    ; R0 = rate * fine dampening factor
1403
1404                          ;       Convert fine PS rate to increments/cycle and output.
1405
1406 809a56 0a209b82          mpyf    @FBRate2Inc,r0  ; R0 = rate converted to increments/cycle
1407 809a57 05000000          fix     r0
1408 809a58 15400658          sti     r0,*+P(FRate)   ; Send new fine rate on it's way
1409 809a59 15400532          sti     r0,*+V(FBFRate) ; Store rate for VME monitoring
1410
1411 809a5a 07209b7a          ldf     @CurFErr,r0
1412 809a5b 14209b7b          stf     r0,@PrevFErr    ; Previous Error = Current Error
1413
1414 809a5c 0ea00000          popf    r0
1415 809a5d 0e20000c          pop     r0
1416 809a5e 0e350000          pop     st
1417 809a5f 78000000          reti
```

APPENDIX 2

Copyright 1991 (Unpublished Work) Carco Electronics, Inc.

TMS320C30 COFF Assembler    Version 4.00   Wed Jul 03 07:02:29 1991
Copyright (c) 1987-1990  Texas Instruments Incorporated Position Synthesizer DSP program.   Version 07-03-91           PAGE   1

```
0004
0005                         ;       Variable pointer definitions
0006
0007         00009c00        CMaxNeg .set    9c00h   ; DP relative
0008         00009c01        C359Q16 .set    9c01h   ; DP relative
0009         00000008        CM1Q16  .set    ar0     ;
0010         00000009        C36Q0   .set    ar1
0011         0000000b        F16Tmp  .set    ar3
0012         0000000c        RCorPos .set    ar4     ; x bus output
0013         0000000d        CrsBAMS .set    ar5     ; Serial output 0
```

```
0014        0000000e    CRate    .set    ar6       ; Serial input 0
0015        0000000f    FRate    .set    ar7       ; Serial input 1
0016
0017        00809800    Block0   .set    809800h
0018        00809c00    Block1   .set    809C00h
0019        00800000    XBus     .set    800000h
0020        00808000    Ser0     .set    808000h
0021        00808010    Ser1     .set    808010h
0022        00000048    DX       .set    48h
0023        0000004c    DR       .set    4Ch
0024
0025 000000                      .asect  "Vectors",0
0026 000000 00000001             .word   Init
0027
0028                    ;        Program initialization
0029
0030 000001 08700000    init     ldi     0,dp
0031 000002 08280032             ldi     @PerBase,ar0
0032 000003 08600000             ldi     0,r0
0033 000004 15400060             sti     r0,*+ar0(XBCtl)  ; No wait states on eXpansion bus
0034
0035 000005 08600030             ldi     0030h,r0         ; 1 wait on primary bus if not ready
0036 000006 15400064             sti     r0,*+ar0(PBCtl)
0037
0038 000007 08200033             ldi     @SerGCtl,r0
0039 000008 15400040             sti     r0,*+ar0(SG0Ctl); Init Serial port global control reg
0040 000009 15400050             sti     r0,*+ar0(SG1Ctl)
0041
0042 00000a 08600331             ldi     0331h,r0
0043 00000b 15400042             sti     r0,*+ar0(SX0Ctl); Init Serial Xmit control reg
0044 00000c 15400052             sti     r0,*+ar0(SX1Ctl)
0045
0046 00000d 08600111             ldi     0111h,r0
0047 00000e 15400043             sti     r0,*+ar0(SR0Ctl); Init Serial Rcve control reg
0048 00000f 15400053             sti     r0,*+ar0(SR1Ctl)
0049
0050 000010 08750800             ldi     0800h,st         ; Enable cache, OVM = 0 (OFF)
0051
0052 000011 08680034             ldi     CodeBeg,ar0      ; Copy program to Block0
0053 000012 08290025             ldi     @ProgPtr,ar1
0054 000013 087b0014             ldi     ProgEnd-ProgBeg,rc
0055 000014 64000016             rptb    CpyProg
0056 000015 08402001             ldi     *ar0++,r0
0057 000016 15402101    CpyProg  sti     r0,*ar1++
```

Copyright 1991 (Unpublished Work) Carco Electronics, Inc.

TMS320C30 COFF Assembler    Version 4.00    Wed Jul 03 07:02:29 1991
Copyright (c) 1987-1990  Texas Instruments Incorporated Position Synthesizer DSP program.    Version 07-03-91

```
0058
0059 000017 08680027             ldi     DataBeg,ar0      ; Copy data to Block1
0060 000018 08290026             ldi     @DataPtr,ar1
0061 000019 087b0004             ldi     DataEnd-DataBeg,rc
0062 00001a 6400001c             rptb    CpyData
```

```
0063  00001b  08402001           ldi     *ar0++,r0
0064  00001c  15402101   CpyData sti     r0,*ar1++
0065
0066  00001d  0828002b           ldi     @DefAr0,ar0
0067  00001e  0829002c           ldi     @DefAr1,ar1
0068  00001f  082b002d           ldi     @DefAr3,ar3
0069  000020  082c002e           ldi     @DefAr4,ar4
0070  000021  082d002f           ldi     @DefAr5,ar5
0071  000022  082e0030           ldi     @DefAr6,ar6
0072  000023  082f0031           ldi     @DefAr7,ar7
0073  000024  60809800           br      ProgBeg
0074
0075                      ;      Initialization data set
0076
0077  000025  00809800   ProgPtr .word   Block0
0078  000026  00809c00   DataPtr .word   Block1
0079
0080  000027  7fffffff   DataBeg .word   07fffffffh    ; DP+0         CMaxNeg
0081  000028  01670000            .word  001670000h    ; DP+1         C359Q16
0082  000029  ffff0000            .word  0ffff0000h    ; DP+2 (AR0)   CM1 Q16
0083  00002a  00000168            .word  360           ; DP+3 (AR1)   C360Q16
0084  00002b             DataEnd
0085
0086  00002b  00809c02   DefAr0  .word   Block1+2      ; AR0          CM1 Q16
0087  00002c  00809c03   DefAr1  .word   Block1+3      ; AR1          C360Q0
0088  00002d  00809c04   DefAr3  .word   Block1+4      ; AR3          F16Tmp
0089  00002e  00800000   DefAr4  .word   XBus+0        ; AR4          RCorPos
0090  00002f  00808048   DefAr5  .word   Ser0+DX       ; AR5          CrsBAMS
0091  000030  0080804c   DefAr6  .word   Ser0+DR       ; AR6          CRate
0092  000031  0080805c   DefAr7  .word   Ser1+DR       ; AR7          FRate
0093
0094  000032  00808000   PerBase .word   0808000h      ; Peripheral base address
0095          00000060   XBCtl   .set    060h          ; eXpansion bus control reg addr
0096          00000064   PBCtl   .set    064h          ; Primary bus control reg addr
0097  000033  0c3ff004   SerGCtl .word   0c3ff004h
0098          00000040   SG0Ctl  .set    040h
0099          00000050   SG1Ctl  .set    050h
0100          00000042   SX0Ctl  .set    042h
0101          00000052   SX1Ctl  .set    052h
0102          00000043   SR0Ctl  .set    043h
0103          00000053   SR1Ctl  .set    053h
0104
0105  000034             CodeBeg
0106
```

Copyright 1991 (Unpublished Work) Carco Electronics, Inc.

TMS320C30 COFF Assembler    Version 4.00    Wed Jul 03 07:02:29 1991
Copyright (c) 1987-1990  Texas Instruments Incorporated Position Synthesizer DSP program.   Version 07-03-91

```
0108                      ;       Position synthesizer routine.
0109
0110  809800               .asect "PosSyn",Block0
0111  809800      ProgBeg
```

```
0112 809800 08700000              ldi    0,dp
0113 809801 08664f4b              ldi    "KO",r6
0114 809802 15260000              sti    r6,@0         ; Set reset vector to "OK" to show init done
0115 809803 08660000              ldi    0,r6          ; Clear coarse position
0116 809804 08630000              ldi    0,r3          ; Clear fine position
0117 809805 1546c600              sti    r6,*CRate     ; Clear course rate input
0118 809806 1543c700              sti    r3,*FRate     ; Clear fine rate input
0119 809807 08700080              ldp    Block1        ; Init DP
0120 809808 0864fff0              ldi    -16,r4        ; R4 = right shift 16 bit count reg
0121
0122 809809 083b9c00       PosSyn ldi    @CMaxNeg,rc   ; 2^31*600 nS = 1031 Sec = 17 Min.
0123 80980a 64809812              rptb   endloop       ; Total overhead is 9 cycles every 17 minutes
0124
0125                       ;      Loop is 8 cycles (480 nS)
0126
0127 80980b 8b43c1c7              mpyi3  *C360Q0,r0    ; R0 = crs integral Q16
0128                       ||     addi3  *FRate,r3     ; R3 = updated fine BAMS (from serial)
0129 80980c 24050304              lsh3   r4,r3,r5      ; R5 = upper 16 bits fine
0130 80980d cfb5c3c6              addi3  *CRate,r6     ; R6 = updated crs BAMS (from serial)
0131                       ||     sti    r5,*F16Tmp    ;     Save fine 16 MSB for parallel add below
0132 80980e ce8ec5c3              addi3  r1,*F16Tmp,r2 ; R2 = crs + fine (Correlated Position)
0133                       ||     sti    r6,*CrsBAMS   ;     Send crs BAMS (to serial)
0134
0135                       ; Mods to Correlated Position in R2 can go here.
0136                       ; Ex. 2's complement = "addi   @CM180Q16,r2"
0137
0138 80980f 274100c3              subi3  *F16Tmp,r0,r1 ; R1 = crsQ16 - fineQ16
0139 809810 d04ac4c0              and3   *CM1Q16,r1    ; R1 = crs integral bits only
0140                       ||     sti    r2,*RCorPos   ;     Send correlated position to XBus reg
0141 809811 53a19c01              ldin   @C359Q16,r1   ;     If negative, crs = 359
0142 809812 24000604       endloop lsh3  r4,r6,r0      ; R0 = upper 16 bits crs
0143
0144 809813 60809809              br     PosSyn        ; Count has timed out, re-init
0145 809814                ProgEnd
```

No Errors, No Warnings

What is claimed is:

1. Apparatus for producing an output signal at an output terminal, the output signal being a representation of an actual position signal that is updated at intervals, comprising:

position error means, responsive to the output signal and to the actual position signal, for generating a rate signal that changes in accordance with the difference between the actual position signal and the output signal; and position computation means, responsive to said rate signal and coupled to the output terminal, for generating the output signal, for changing the output signal at a rate representative of said rate signal, and for updating the output signal a plurality of times for each time that the actual position signal is updated;

said position error means changing said rate signal in a manner tending to null the difference between the actual position signal and the output signal at the times when the actual position signal is updated.

2. The apparatus of claim 1 wherein said position error means operates to store at least one previous value of said difference and to change said rate signal by an amount that depends on the current value of said difference and said at least one previous value of said difference.

3. The apparatus of claim 1 wherein said position computation means operates to change the output signal at a rate proportional to the value of said rate signal.

4. The apparatus of claim 1 wherein said position error means is incorporated in a programmed digital processor.

5. Apparatus comprising:

position means for providing an actual position signal that is updated at intervals;

position error means, having a primary signal input and a feedback signal input and being responsive to signals at said primary and feedback signal inputs, for generating a rate signal that changes in accordance with an error signal representing the difference between signals present at said primary and feedback signal inputs;

position computation means, having a rate signal input and being responsive to signals at said rate signal input, for generating a computed signal that changes at a rate corresponding to signals present at said rate signal input and that is updated a plurality of times for each time that the actual position signal is updated; and means for communicating said actual position signal to said primary signal input, said rate signal to said rate signal input, and said computed signal to said feedback signal input, whereupon said position computation means varies said computed signal so as to null said error signal.

6. The apparatus of claim 5 wherein said position means comprises:

timing means for generating an excitation signal at a first frequency and a counter signal at a second frequency that is a given multiple of said first frequency;

position sensor means, responsive to a position to be sensed and to said excitation signal, for providing a sensor signal;

counter means, responsive to said counter signal, for counting at said second frequency; and latch means, responsive to said sensor signal, for latching the content of said counter, the latched value of which constitutes said actual position signal.

7. The apparatus of claim 5 wherein said position error means operates to store at least one previous value of said error signal and to change said rate signal by an amount that depends on the current value and said at least one previous value of said error signal.

8. The apparatus of claim 5 wherein said position computation means operates to change said computed signal at a rate proportional to the value of said rate signal.

9. The apparatus of claim 5 wherein said position error means is incorporated in a programmed digital processor.

10. Apparatus comprising:

position means for providing an actual position signal that is updated at intervals and an interrupt signal specifying that the actual position signal is being updated;

position error means, having a primary signal input, an interrupt signal input, and a feedback signal input and being responsive to signals at said primary, interrupt, and feedback signal inputs, for generating a rate signal that changes in accordance with an error signal representing the difference between signals present at said primary and feedback signal inputs;

position computation means, having a rate signal input and being responsive to signals at said rate signal input, for generating a computed signal that changes at a rate corresponding to signals present at said rate signal input and that is updated a plurality of times for each time that the actual position signal is updated; and means for communicating said actual position signal to said primary signal input, said interrupt signal to said interrupt signal input, said rate signal to said rate signal input, and said computed signal to said feedback signal input, whereupon said position computation means varies said computed signal so as to null said error signal.

11. The apparatus of claim 10 wherein said position means comprises:

timing means for generating an excitation signal at a first frequency and a counter signal at a second frequency that is a given multiple of said first frequency;

position sensor means, responsive to a position to be sensed and to said excitation signal, for providing a sensor signal;

counter means, responsive to said counter signal, for counting at said second frequency; and latch means, responsive to said sensor signal, for latching the content of said counter, the latched value of which constitutes said actual position signal.

12. The apparatus of claim 10 wherein said position error means operates to store at least one previous value of said error signal and to change said rate signal by an amount that depends on the current value and said at least one previous value of said error signal.

13. The apparatus of claim 10 wherein said position computation means operates to change said computed signal at a rate proportional to the value of said rate signal.

14. The apparatus of claim 10 wherein said position error means is incorporated in a programmed digital processor.

15. A method for producing an output signal that is a representation of an actual position signal that is updated at intervals, comprising the steps of:

generating the output signal;

generating a rate signal that changes in accordance with the difference between the actual position signal and the output signal; and changing the output signal at a rate representative of the rate signal while updating the output signal a plurality of times for each time that the actual position signal is updated;

the rate signal being changed in a manner tending to null the difference between the actual position signal and the output signal at the times when the actual position signal is updated.

16. The method of claim 15 wherein at least one previous value of the difference is stored and the rate signal is changed by an amount that depends on the current value of the difference and the at least one previous value of the difference.

17. The method of claim 15 wherein the output signal is changed at a rate proportional to the value of the rate signal.

18. The method of claim 15 wherein said generating and changing steps are performed in a programmed digital processor.

19. A method for producing a position output signal comprising the steps of:

generating the position output signal;

updating an actual position signal and providing an interrupt signal at intervals;

generating, in response to the interrupt signal, an error signal representing the difference between the actual position signal and the position output signal when the interrupt is received, and a rate signal that changes in accordance with the error signal;

changing the position output signal at a rate corresponding to the rate signal;

updating the position output signal a plurality of times for each time that the actual position signal is updated.

20. The method of claim 19 wherein said providing step comprises the substeps of:
  providing a position sensor;
  generating an excitation signal at a first frequency and a counter signal at a second frequency that is a given multiple of the first frequency;
  exciting the position sensor to provide a sensor signal;
  incrementing a count at said second frequency; and
  storing the count at a predetermined portion of the sensor signal cycle, the stored count defining the actual position signal.

21. The method of claim 19 wherein at least one previous value of the difference is stored and the rate signal is changed by an amount that depends on the current value of the difference and the at least one previous value of the difference.

22. The method of claim 19 wherein the position output signal is changed at a rate proportional to the value of the rate signal.

23. The method of claim 19 wherein said generating and changing steps are performed in a programmed digital processor.

* * * * *